Sept. 22, 1964     E. P. BULLARD IV     3,149,507

MACHINE TOOL

Filed Aug. 15, 1961     2 Sheets-Sheet 1

*INVENTOR.*
EDWARD P. BULLARD IV

BY

ATTORNEY

Sept. 22, 1964    E. P. BULLARD IV    3,149,507
MACHINE TOOL

Filed Aug. 15, 1961    2 Sheets-Sheet 2

*INVENTOR.*
EDWARD P. BULLARD IV

BY Paul M. Rist

ATTORNEY

United States Patent Office 3,149,507
Patented Sept. 22, 1964

3,149,507
MACHINE TOOL
Edward P. Bullard IV, Fairfield, Conn., assignor to The Bullard Company, Bridgeport, Conn., a corporation of Connecticut
Filed Aug. 15, 1961, Ser. No. 131,645
8 Claims. (Cl. 77—3)

The present invention relates to machine tools and particularly to a new and improved rotatable and axially movable spindle, and to a control therefor.

Certain machine tools such as horizontal boring mills employ a rotatable, axially movable spindle that supports a metal working tool for performing operations on work. The spindle is mounted horizontally in a vertically movable head, and the work is mounted on a support that is movable along right angular axes in a horizontal plane adjacent the spindle head. It is usual practice in such machines to provide power and manual means for axially moving the rotatable spindle so as to bore, drill or tap a work piece to a predetermined depth. It becomes a substantial problem to accurately determine the desired depth of such work operations, and in particular, where a large number of such boring, drilling or tapping operations are to be performed on each of identical work pieces during a production run.

An object of the present invention is to provide a manual control for such a spindle in combination with a power stop control for the axial movement of the spindle.

Another object of the invention is to provide such a control for an axially movable spindle of a machine tool in which a plurality of presettable means is provided for accurately determining the extent of axial movement of the spindle.

Still another object of the invention is to provide such a control for an axially movable spindle in which the power stop control is rendered ineffective when the manual means is employed, and vice versa.

Still another object of the invention is to provide such a control for a machine tool spindle in which a selected of the presettable means may be rendered effective by a manually operable distributor switching device.

In one aspect of the invention, a rotatable axially movable spindle may be rotated in either direction through a rotatable, axially fixed sheave that is internally splined to the spindle. A separate power drive may rotate a pinion device that moves axially with the spindle and which meshes with a stationary rack means. The means that rotate the pinion device may also rotate a plurality of separately adjustable disks and the design may be such that the total axial movement of the spindle is proportional to the peripheral length of the disks. Each disk may be provided with a fixed dog adapted to actuate a switch for rendering ineffective the power that axially moves the spindle.

In another aspect of the invention, a manually operable distributor switching device may be employed to selectively render effective any desired disk of the set.

In still another aspect of the invention, means may be provided for manually moving the spindle axially and it may be arranged so that upon rendering it effective, the power means for axially moving the spindle is rendered ineffective.

In still another aspect of the invention, means may be provided for roughly controlling the axial movement of the spindle under power operation.

The above, other objects and novel features of the invention will become apparent from the following specification and accompanying drawings which are merely exemplary.

Figure 1:
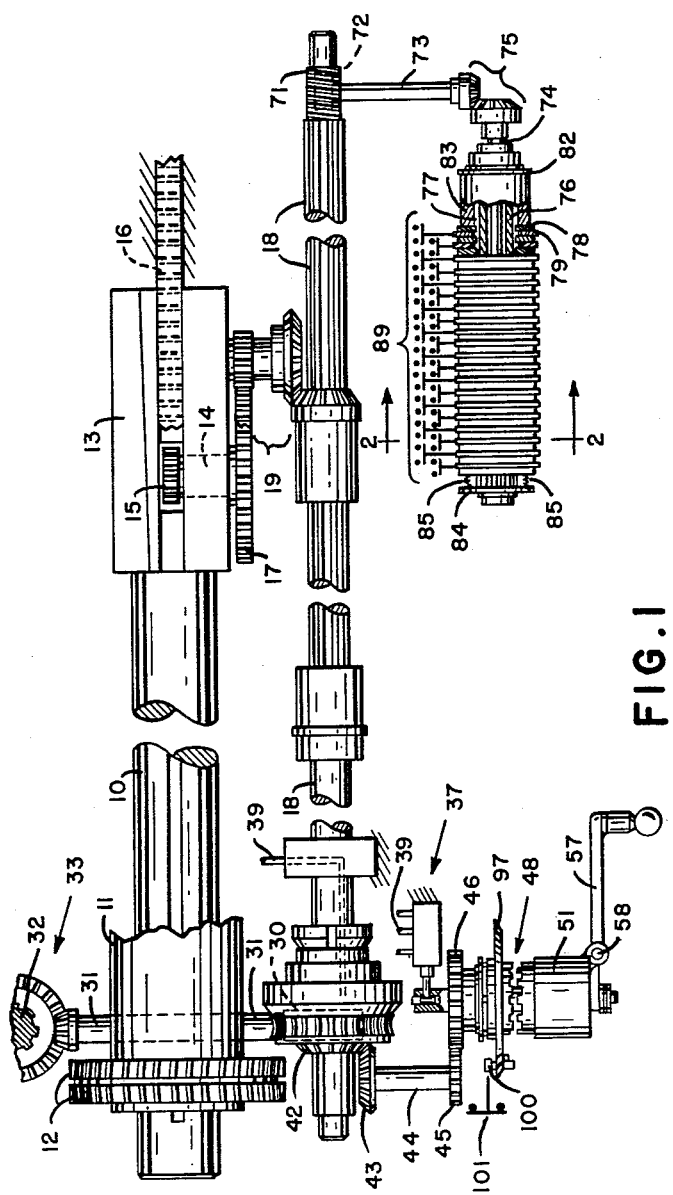
FIG. 1 is a schematic layout of certain parts of a horizontal boring mill to which the principles of the invention have been applied.

Referring to the drawings, and particularly to FIG. 1, the principles of the invention are shown as applied to certain parts of a horizontal boring mill including a spindle 10 that is splined keyed to a rotatable sleeve 11. The sleeve 11 is fixed to gear means 12 that may be driven in either direction at any one of a large number of speeds by a headstock transmission (not shown) which headstock is shown, described and claimed in application Serial Number 130,598, filed August 10, 1961, in the names of E. P. Bullard III, et al.

The spindle 10 may be connected to a non-rotatable housing 13 in a manner to permit spindle 10 to rotate therein and to permit the housing 13 to move axially with spindle 10. The housing 13 may support a shaft 14 for free rotation therein. A pinion 15 fixed to the shaft 14 may mesh with rack means 16 that is stationarily mounted in the frame of the machine. From the foregoing, it is evident that rotation of pinion means 15 in both directions will extend spindle 10 leftwardly from within sleeve 11 and retract it rightwardly.

The end of shaft 14 opposite that supporting pinion means 15, supports a gear 17 that is driven from splined shaft 18 through gearing means 19, all as more fully described in the above-referred-to patent application.

Figure 3:
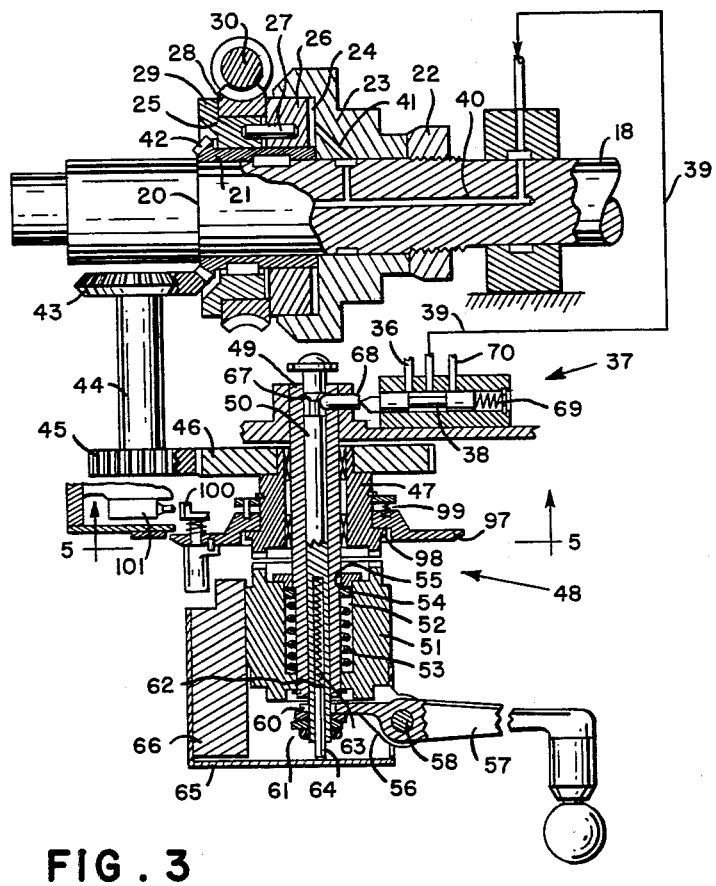
FIG. 3 is an enlarged sectional view of parts of the apparatus shown in FIG. 1.

Referring to FIG. 3, the shaft 18 is provided with a shoulder 20 against which a sleeve 21 is forced through the action of a nut 22 threaded on shaft 18 and a member 23 having a cylinder 24 for a purpose to be described later. The sleeve 21 is keyed to shaft 18 and it has keyed to it a flanged collar 25.

A piston 26 journaled on sleeve 21 is mounted within cylinder 24 and it is pinned to collar 25 by pins 27. The pins 27 are designed so that relative axial movement may occur between piston 26 and collar 25. A worm gear 28 may be journaled on sleeve 25 between its flange 29 and piston 26.

A worm 30 (FIGS. 1 and 3) meshes with worm gear 28 and it is connected to a shaft 31, that is driven from a splined shaft 32 through bevel gearing 33. The shaft 32 is adapted to be rotated in opposite directions through a reversing clutch arrangement (not shown) that is rendered active by the energization of solenoids 34 and 35 (FIG. 4) as more fully described in the above-referred-to application.

Figure 4:
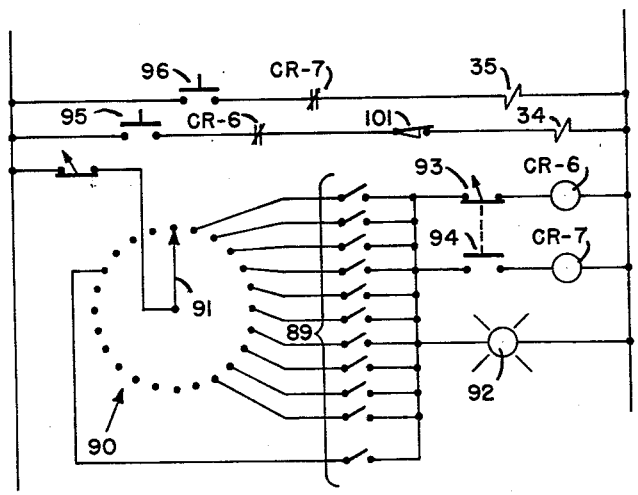
FIG. 4 is a wiring diagram for the apparatus shown in FIGS. 1 and 3.

Referring to FIG. 3, a source of pressure fluid 36 may be connected to a spool valve 37, and in the position of the spool 38 thereof as shown in FIG. 3, pressure fluid flows through lines 39, 40 and 41 to cylinder 24, thereby forcing piston 26 leftwardly binding gear 28 between it and flange 29 so that shaft 18 is rotated by shaft 32 and spindle 10 is caused to move leftwardly or rightwardly depending upon which of the solenoids 34 or 35 is energized (FIG. 4).

Referring again to FIG. 3, means is provided for manually extending and retracting the spindle 10. The sleeve 21 includes at its one end, a bevel gear 42 that meshes with a bevel pinion 43 fixed to a shaft 44. The shaft 44 supports a spur gear 45 that meshes with another spur gear 46. Gear 46 is fixed to one element 47 of a positive tooth clutch 48. The element 47 is journaled on a sleeve 49 which latter is in turn journaled on a shaft 50. Another element 51 of clutch 48 is also journaled on sleeve 49 and it is provided with a recess 52 within which a compression spring 53 is located that acts against a collar 54 that abuts against a stepped shoulder 55 on the sleeve 49. This construction normally maintains the teeth of clutch 48 separated.

A bracket 56 on element 51 pivotally supports a hand crank 57 on a pin 58. The end of crank 57 above pin 58 includes a fork 60 that straddles shaft 50, and collar means 61 is fixed to shaft 50 beyond the point where fork 60 straddles shaft 50. The shaft 50 is provided with a bore 62 within which is located a spring 63 and a pin 64, the outer end of which latter abuts against a plate 65 fixed to a segmental counterweight 66 that is fixed to clutch element 51. The end of shaft 50, opposite that which is connected to crank 57, is provided with a groove and cam surface 67 that cooperates with a stem 68, against which spool 38 of valve 37 is urged by a spring 69.

From the foregoing, it is evident that movement of crank arm 57 in a counterclockwise direction about pin 58 causes shaft 50 to move downwardly (FIG. 3) actuating spool 38 to connect line 39 to an exhaust port 70. Accordingly, piston 26 releases worm gear 28 so that collar 25, piston 26 and member 23 are free from gear 28.

Movement of crank arm 57 counterclockwise also effects the engagement of the teeth of clutch elements 47 and 51. Therefore, rotation of hand crank 57 while depressed toward the frame of the machine will rotate shaft 18 and hence cause axial movement of the spindle 10. Upon releasing hand crank 57, spring 53 will disengage the clutch teeth while spring 63 will shift shaft 50 so that spring 69 will move spool 38 to connect line 39 to line 36, thereby causing piston 26 to engage gear 28 to render effective the power drive for shaft 18.

Referring again to FIG. 1, the rear end of shaft 18 is provided with a worm 71 that meshes with a worm wheel 72 fixed to a shaft 73. Shaft 73 drives another shaft 74 through bevel gears 75. The shaft 74 is pinned to a tubular shaft 76 having spline teeth 77 axially along its outer peripheral surface. Alternating different diameter disks 78 and 79 are mounted on the shaft 76. The smaller diameter disks 78 are provided with internal teeth 80 that mate with spline teeth 77, while the central bore 81 of the larger diameter disks 79 clear the top of the spline teeth 77.

A collar 82 is fixed to shaft 74 and a spacer 83 abuts against collar 82 at its one end, and the last plate 78 abuts the other end of spacer 83. Another collar 84 is fixed to the end of shaft 74 opposite that supporting collar 82, and compression springs 85 between collar 84 and the first disk 78 of the series frictionally drive the disks 79 through the shaft 74.

Figure 2:
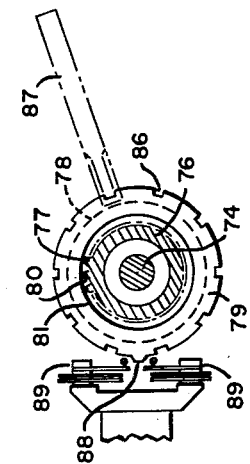
FIG. 2 is a sectional elevational view taken substantially along line 2—2 of FIG. 1.

Referring to FIG. 2, each of the disks 79 are provided with notches 86 within which the end of a tool 87 can be placed for turning the disks 79 to any predetermined position relatively to the disks 78 and shaft 74. Each disk 79 is also provided with a fixed dog or cam 88 adapted to close a switch 89. As shown in FIGS. 1 and 2, the switches 89 are staggered for successive disks 79 so that space is conserved.

The gearing between spindle 10, shaft 74 and the diameter of disks 79 are such that the shaft 74 makes a single revolution while the spindle 10 moves throughout its range of axial motion. Accordingly, a program of different positions to which the spindle 10 is desired to be extended in performing a series of operations on the work can be preset by presetting the disks 79.

Referring to FIG. 4, the one terminal of each switch 89 is connected to a separate contact of a distributor 90. A contact arm 91 of distributor 90 is adapted manually to be set by the operator to select a circuit including a switch 89 and its corresponding disk 79. All of the switches 89 are in parallel with relays CR–6 and CR–7 as well as a light 92. Contacts 93 and 94 are in series with relays CR–6 and CR–7 respectively.

With the circuit in the condition shown in FIG. 4, closing push button 95, energizes solenoid 34 causing the shaft 32 (FIG. 1) to rotate in a direction to extend the spindle leftwardly. A toggle switch including contacts 93 and 94 may be set by the operator depending upon which axial direction the spindle 10 is to be moved. In FIG. 4, the contacts 93 are shown closed and contacts 94 open. With arm 91 contacting one of the distributor points that is connected to a selected open switch 89, no circuit is completed. The leftward movement of spindle 10 continues until the disk 79 corresponding to the switch 89 that is in circuit with arm 91 closes the switch 89. This energizes relay CR–6 which opens contacts CR–6, thereby de-energizing solenoid 34 stopping the leftward movement of the spindle 10. It is to be noted that the switch 95 must be held closed by the operator during the entire movement of the spindle 10.

In the same way, closing push button switch 96 energizes solenoid 35 causing the spindle 10 to move rightwardly, and its extent of rightward movement is controlled by relay CR–7 in the same way that relay CR–6 controls the leftward movement of spindle 10. When the desired position of spindle 10 has been reached, the light 92 will become illuminated indicating that the desired position has been reached.

Figure 5:
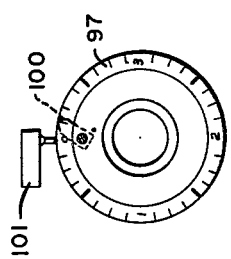
FIG. 5 is a view taken substantially along line 5—5 of FIG. 3.

Referring to FIGS. 3 and 5, a disk 97 may be journaled on the clutch element 47. Disk 97 may be resiliently urged into frictional engagement with a flange 98 by spring means 99. The disk 97 may support a dog 100 that may be moved into or out of cooperating position relatively to a switch 101 (see also FIG. 4). The disk 97 may have indices representing inches and half inches about it. By turning disk 97 clockwise (FIG. 5) so that a desired amount of leftward movement of spindle 10 is beneath the switch 101, as the spindle 10 moves leftwardly, the disk 97 turns counterclockwise until dog 100 opens switch 101 (FIG. 4), thereby de-energizing solenoid 34 and stopping the leftward movement of spindle 10.

Although the various features of the new and improved spindle control have been shown and described in detail to fully disclose one embodiment of the invention, it will be evident that changes may be made in such details and certain features may be used without others without departing from the principles of the invention.

What is claimed is:

1. In a machine tool, a spindle adapted to be rotated in either direction; power means for axially moving said spindle in either direction; a plurality of separately adjustable disks; non-adjustable disks between adjacent adjustable disks; resilient means urging all of said disks in one direction against a fixed abutment, all of said disks being driven by the means that axially moves said spindle; and separate aligned means actuated by said adjustable disks for stopping said power means.

2. In a machine tool, a spindle adapted to be rotated in either direction; power means for axially moving said spindle in either direction; a plurality of separately adjustable disks; non-adjustable disks between adjacent adjustable disks; resilient means urging all of said disks in one direction against a fixed abutment, all of said disks being driven by the means that axially moves said spindle; separate aligned means actuated by said adjustable disks for stopping said power means; manually operable means for axially moving said spindle; and means for rendering said power means ineffective upon the actuation of said manually operable means.

3. In a machine tool, a sleeve adapted to be driven in either direction; a spindle splined keyed to said sleeve; a shaft adapted to be rotated in either direction; power means for rotating said shaft in either direction; rack and pinion means between said shaft and said spindle for axially moving said spindle in either direction; a plurality of adjustable disks having cams thereon, driven by said shaft, the peripheral dimensions of said disks and the driving means therefor representing the extent of axial movement of said spindle; non-adjustable disks between adjacent adjustable disks; resilient means urging all of said disks in one direction against a fixed abutment; a switch for each of said adjustable disks; means for adjusting each of said adjustable disks separately; and means for rendering effective a selected of said switches and rendering ineffective all other of said switches.

4. In a machine tool, a sleeve adapted to be driven in either direction; a spindle splined keyed to said sleeve; a shaft adapted to be rotated in either direction; power means for rotating said shaft in either direction; rack and pinion means between said shaft and said spindle for axially moving said spindle in either direction; a plurality of adjustable disks having cams thereon mounted on a shaft for frictional driving relation; the peripheral dimensions of said disks and the driving means therefor representing the extent of axial movement of said spindle; non-adjustable disks between adjacent adjustable disks; resilient means urging all of said disks in one direction against a fixed abutment; a switch for each of said adjustable disks; means for adjusting each of said adjustable disks separately; and means for rendering effective a selected of said switches and rendering ineffective all other of said switches.

5. In a machine tool, a sleeve adapted to be driven in either direction; a spindle splined keyed to said sleeve; a shaft adapted to be rotated in either direction; power means for rotating said shaft in either direction; rack and pinion means between said shaft and said spindle for axially moving said spindle in either direction; a plurality of disks keyed to another shaft; a plurality of disks alternating with said keyed disks and turnable on said other shaft; means forcing all of said disks into frictional contact; a driving connection between said shafts; a switch for each of said turnable disks; means for separately adjusting each of said turnable disks; and means for rendering effective a selected of said switches and rendering ineffective all other of said switches.

6. In a machine tool, a sleeve adapted to be driven in either direction; a spindle splined keyed to said sleeve; a shaft adapted to be rotated in either direction; power means for rotating said shaft in either direction; rack and pinion means between said shaft and said spindle for axially moving said spindle in either direction; a plurality of adjustable disks having cams thereon, driven by said shaft, the peripheral dimensions of said disks and the driving means therefor representing the extent of axial movement of said spindle; non-adjustable disks between adjacent adjustable disks; resilient means urging all of said disks in one direction against a fixed abutment; a switch for each of said adjustable disks; means for adjusting each of said adjustable disks separately; means for rendering effective a selected of said switches and rendering ineffective all other of said switches; manually operable means for reciprocating said spindle; and means for rendering ineffective said power means when said manually operable means is rendered effective.

7. In a machine tool, a sleeve adapted to be driven in either direction; a spindle splined keyed to said sleeve; a shaft adapted to be rotated in either direction; power means for rotating said shaft in either direction; rack and pinion means between said shaft and said spindle for axially moving said spindle in either direction; a plurality of adjustable disks having cams thereon mounted on a shaft for frictional driving relation, the peripheral dimensions of said disks and the driving means therefor representing the extent of axial movement of said spindle; non-adjustable disks between adjacent adjustable disks; resilient means urging all of said disks in one direction against a fixed abutment; a switch for each of said adjustable disks; means for adjusting each of said adjustable disks separately; means for rendering effective a selected of said switches and rendering ineffective all other of said switches; manually operable means for reciprocating said spindle; and means for rendering ineffective said power means when said manually operable means is rendered effective.

8. In a machine tool, a spindle adapted to be rotated in either direction; power means for axially moving said spindle in either direction; a plurality of separately adjustable disks; non-adjustable disks between adjacent adjustable disks; resilient means urging all of said disks in one direction against a fixed abutment, all of said disks being driven by the means that axially moves said spindle; separate aligned means actuated by said adjustable disks for stopping said power means; manually operable means for axially moving said spindle; a separate adjustable disk driven by said manually operable means; and pivotally mounted dog means on said adjustable disk for rendering ineffective said power means.

References Cited in the file of this patent

UNITED STATES PATENTS

| 1,462,354 | Pero | July 17, 1923 |
| 1,638,861 | Lockett | Aug. 16, 1927 |
| 2,528,736 | Bullard | Nov. 7, 1950 |
| 2,876,662 | Carlstedt et al. | Mar. 10, 1959 |

FOREIGN PATENTS

| 828,409 | Great Britain | Feb. 17, 1960 |
| 858,570 | Great Britain | Jan. 11, 1961 |